Sept. 25, 1945.  J. A. PARTON ET AL  2,385,584
STRAIGHT STEM VENT VALVE
Filed June 23, 1943  2 Sheets-Sheet 1
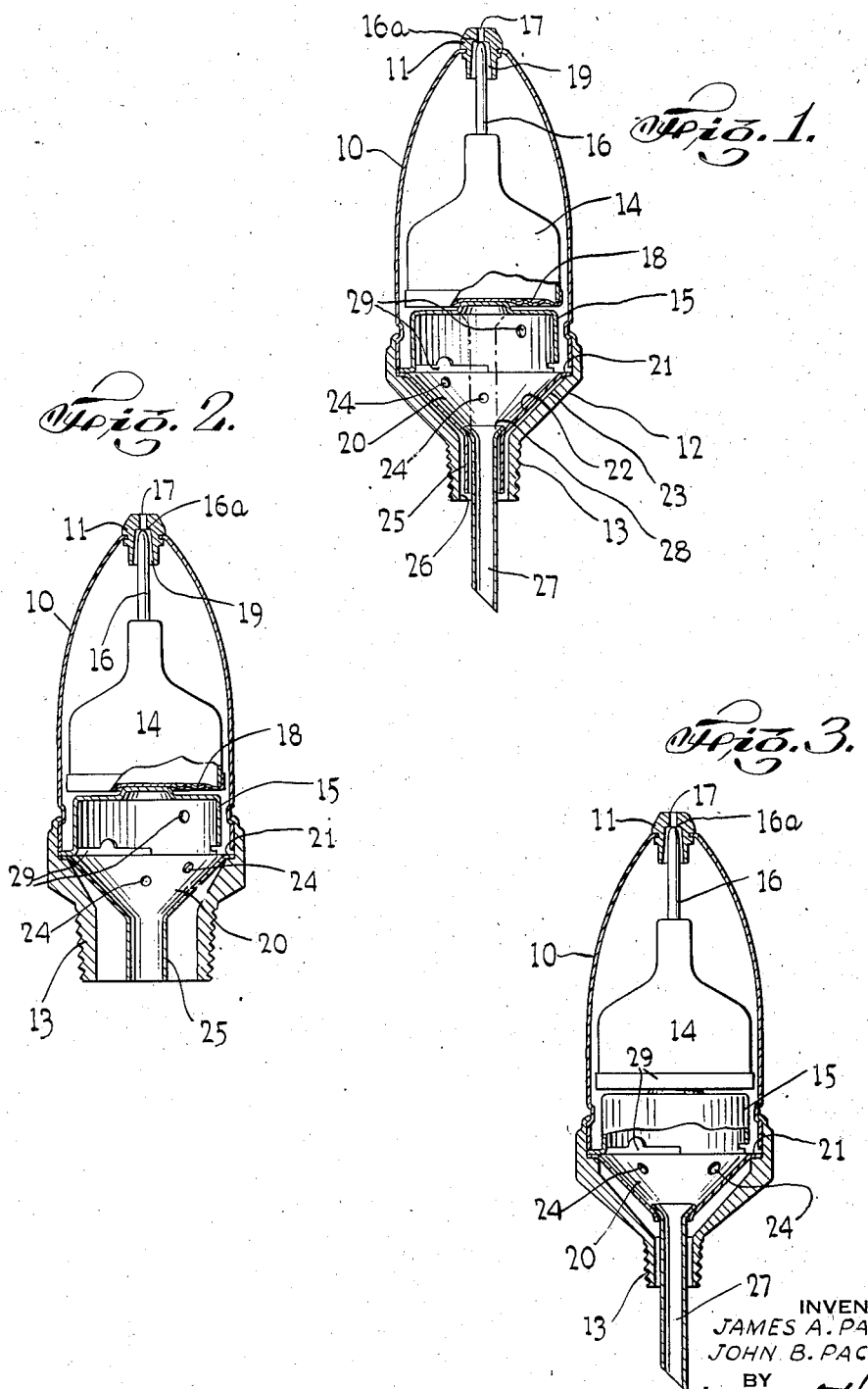
INVENTORS
JAMES A. PARTON
JOHN B. PACE
BY
ATTORNEYS

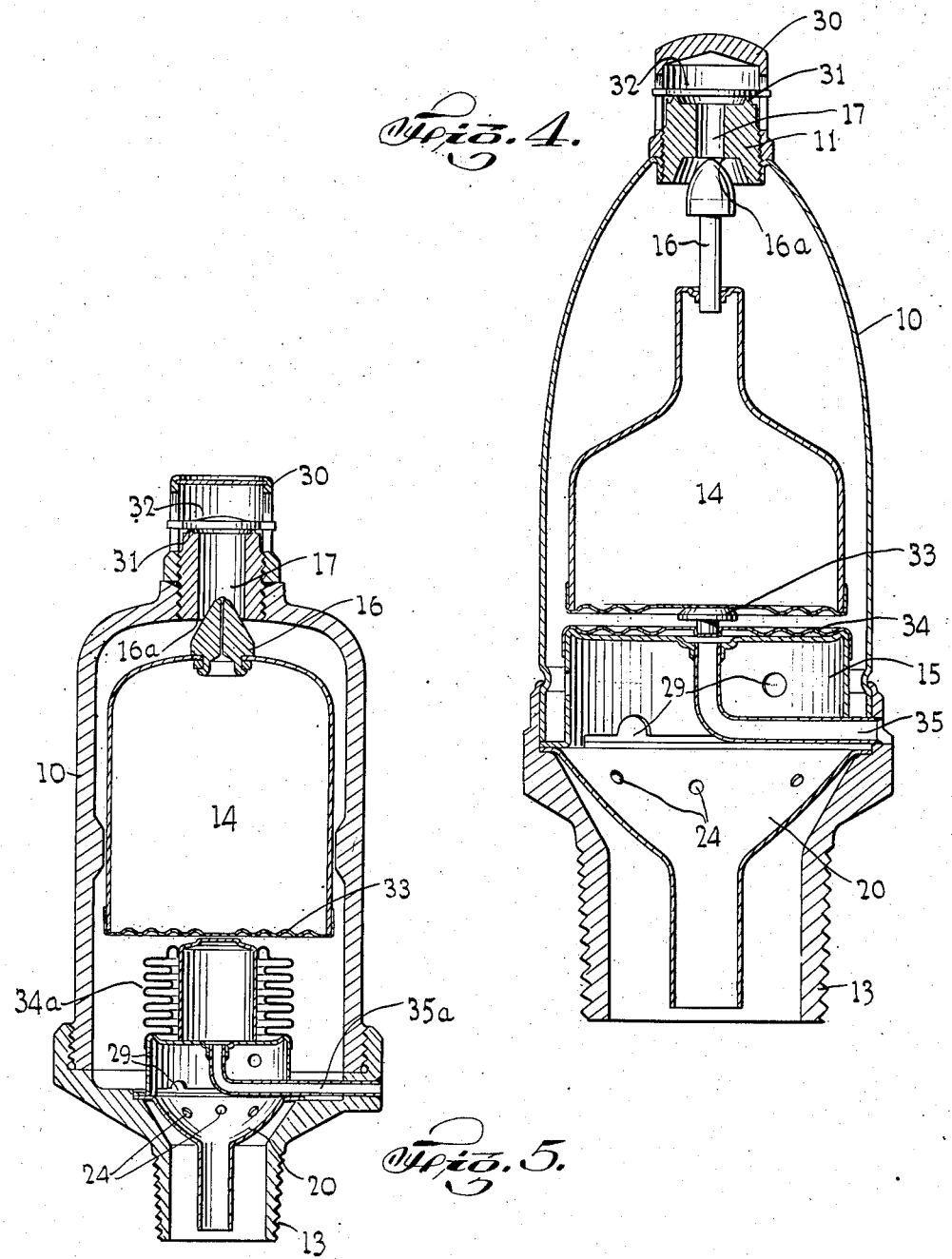

Patented Sept. 25, 1945

2,385,584

UNITED STATES PATENT OFFICE 2,385,584

STRAIGHT STEM VENT VALVE

James A. Parton, Erdenheim, Pa., and John B. Pace, Indianapolis, Ind., assignors to Hoffman Specialty Co., Indianapolis, Ind., a corporation of Illinois Application June 23, 1943, Serial No. 491,860

11 Claims. (Cl. 236—63)

This invention relates to vent valves for steam heating systems for venting air when steam is admitted to such systems and preventing the escape of water or steam from the system. More particularly, it is concerned with vent valves having a straight shank provided with a nipple for making connection with radiators or other parts of the heating system.

In order to prevent "water-logging" of vent valves and provide for prompt drainage of water therefrom, complex designs have been used. Some success has been experienced recently in providing a simpler design for the prompt drainage of water from vent valves provided with a lateral nipple. However, straight shank vent valves of simplified and economical construction which are capable of promptly draining the water surging into them and rapidly venting the radiators or the steam system, have not been available heretofore.

It is the principal object of this invention to provide a vent valve, of the straight shank type, having simplicity and flexibility of design, which is less costly to construct than the best of the commercial valves, and has the same efficiency of operation previously produced.

A special object of the invention is to provide means in an air vent valve to insure rapid drainage of water therefrom in order that venting may be promptly resumed after it has been temporarily interrupted.

Another object of the invention is to provide air valves of various sizes with the greatest possible number of interchangeable parts, particularly those parts having to do with the drainage of water from the valve.

Another object of the invention is to provide parts of a vent valve affecting the drainage and venting of the valve which are not easily damaged either in transit or in use.

Another object of the invention is to shorten the time within which a radiator may be completely relieved of air after steam comes on and is accompanied by water surges.

Other objects of the invention will be obvious from the description which follows.

The manner in which we have accomplished the objects and principles of the invention are explained with respect to concrete illustrative embodiments of the invention.

In the drawings:

Figure 1 represents a longitudinal section of a radiator vent valve embodying the invention open to the atmosphere;

Figure 2 is a similar longitudinal section of a valve of different construction;

Figure 3 is a similar view of a further modified construction;

Figure 4 represents a longitudinal section of a vent valve for a vacuum system; and Figure 5 shows a longitudinal section of a further embodiment of vent valve for a vacuum steam system.

Like reference characters designate similar parts wherever they occur in the figures.

Referring particularly to Figure 1, the vent valve comprises a body or casing 10 having in its upper end a seat fitting or plug 11 and closed at its lower end by a funnel-shaped base 12 which may or may not have tapered side walls leading to an integral nipple 13 of smaller diameter projecting therefrom. A hollow float 14 which contains a thermally expansive fluid is located inside the casing 10 and carries a valve pin 16 which cooperates with the seat 16a in the fitting 11 to open or close the vent passage, and a float support 15 supports the float 14 at the desired position in the valve casing.

The fitting 11 contains a vent port or passage 17 and a valve seat 16a against which the tapered end of the valve pin 16 seats. Float 14 is hollow and has a bottom wall 18 constituting a flexible wall or diaphragm which is capable of expansion when the volatile liquid carried in the float is expanded by the presence of steam in the valve casing. The diaphragm 18 normally rests on the float support 15 which is connected to and supported by the base 12, when there is no water in the valve. In this condition, the valve stem 16 is withdrawn from the seat 16a leaving the vent passage open. An enlarged passage 19 in the fitting 11 guides the valve pin 16 in position to engage the valve seat 16a when the pin is raised either by the distention of the diaphragm 18 or flotation of the float 14.

As long as the valve pin 16 remains off its seat 16a, the valve and hence the heating system will be freely vented to the atmosphere through the passage 17. As steam enters the system, the air will be forced out until the steam reaches the valve casing, whereupon the heat of the steam will cause the volatile fluid in the float 14 to expand, which will distend the diaphragm 18 and seat the end of the valve pin 16 on its seat 16a to prevent the escape of steam from the system. If water is forced into the valve, it will raise the float 14 to likewise seat the valve pin 16 and prevent water from flowing or spurting from the vent passage 17.

Any water which enters the valve should flow promptly back into the system through the base 12 and nipple 13, in order to permit prompt venting of the valve.

To facilitate the drainage of water from the valve a funnel-shaped member 20 is provided inside the base 12 having peripheral flanges 21 resting on the shoulder of the base. The funnel 20 has downwardly sloping sides 22 annularly displaced from the sides 23 of the base 12, and is provided with openings 24 in its side. A funnel tube 25, which is smaller than the bore 26 of the nipple 13, extends into the nipple. In Figure 1, the funnel 20 is provided with an auxiliary tube 27 having a smaller diameter than the funnel tube 25 and the upper end of the tube 27 is flared at 28 to seat on the lower parts of the walls of the funnel 20. This auxiliary tube 27 is capable of sliding or telescoping into the funnel 20, as indicated by the dotted lines in Figure 1, for purposes of adjustment to different heating systems, and to prevent damage to the tube during shipment. The tube 27 may take various positions, such as illustrated by the dotted line telescoped portion illustrated in Figure 1. When the tube 27 is partially telescoped into the funnel 20, water may pass from the funnel through the space between the tube 27 and the funnel tube 25 at the apex of the conical section of the funnel 20 as well as through the tube 27. Where the water drains through this annular space between 27 and 25 drainage is helped by the fact that the exterior of tube 27 serves as a capillary to assist in drainage.

The float support 15 is provided with a series of apertures or passages 29 through which water or steam may flow into and out of the valve casing 10. By a proper correlation between the cross-sectional area of ports 29, openings 24 and the annular space surrounding the tube 25 positioned within the bore 26 of the nipple 13, the flow of water from the base of the valve may be so facilitated that prompt drainage takes place and rapid venting of the radiator is obtained even after the valve has been filled with water.

The embodiment of the invention illustrated in Figure 2 has a larger nipple 13, but otherwise the construction and operation of the various parts is substantially the same as in Figure 1, except that the telescoping tube 27 has been omitted.

In Figure 3 the annular extension 25 which is shown on the funnel 20 in Figure 1 has been omitted and the water drains through the tube 27 while air enters the valve from the openings 24 in the walls of the funnel 20. The air flow is from the system, into the bore of the nipple 13 along the inside of the conical base 12 and into the valve through the openings 24.

When steam is rising and water is not forced into the valve shown in Figures 1 to 3, the float 14 rests upon the float support 15, and the valve stem 16 is unseated from the valve seat 16a permitting air to freely vent through port 17. As the steam rises and the air is driven from the heating system, steam enters the vent valve through the nipple 13, heating the expansible fluid in the float 14, thereby causing a distention of the diaphragm 18, which seats the valve pin 16 in the valve seat 16a. As long as steam remains in the valve, the port 17 remains closed and no steam can escape from the valve. As the steam begins to condense, the volatile fluid in the float 14 condenses, which permits the diaphragm 18 to return to its normal position, thereby withdrawing the pin 16 from its seat 16a and opening the vent passage 17 to the free flow of air back into the system.

Referring now to Figures 4 and 5, which illustrate valves for use on a steam heating system which is maintained under partial vacuum when it is not filled with steam, the plug or seat fitting 11 is provided with a valve cap 30 and an upper circular valve seat 31. A gravity actuated check valve 32 operates to initiate the vacuum when the steam in the system begins to condense. In Figure 4, the float 14 rests upon a post 33. A diaphragm 34, open to the atmosphere, is secured and hermetically sealed to the float support 15. As shown in Figure 5, the diaphragm is in the form of a flexible bellows. The interior of the diaphragm 34 is connected to the outside atmosphere through the tube 35.

In the vacuum system illustrated in Figures 4 and 5, as the steam rises in the heating system, air is forced through the port 17 and the check valve 32 is lifted from its seat until the valve pin 16 is seated on its seat 16a either by the expansion of the volatile fluid in the float 14, or by the flotation of the float by water which is trapped or forced into the valve. When the steam begins to condense and the pressure within the casing 10 becomes less than atmospheric, the check valve 32 again drops upon its seat on the circular knife edge 31. As more steam condenses the check valve 32 prevents the entry of air into the system and the pressure in the system becomes subatmospheric. At this time, the atmospheric pressure operating on the diaphragm 34 through the tube 35 causes the diaphragm 34 to expand upwardly and lift the float 14, thereby bringing valve pin 16 into engagement with the valve seat 16a which holds the vacuum within the system until the next steaming period.

In Figure 4, the expansible diaphragm 34 acts on the flexible bottom of the float 14 through the post 33. The vacuum actuated diaphragm 34 serves to hold the pin 16 on its seat 16a and maintains the vacuum after it has been initiated by the check valve 32, and as the check valve 32 is never subjected to very high pressure it is easily unseated when the vent operation is necessary. When steam again begins to rise, air is driven into the vent valve chamber gradually raising the pressure to atmospheric pressure; the vacuum diaphragm 34 recedes to its original position, valve 16 and valve 32 are unseated, and venting again takes place.

The operation of the embodiment of the invention illustrated in Figure 5 is similar to that in Figure 4, except that an expansible Sylphon bellows 34a takes the place of the diaphragm 34. When the pressure in the system becomes subatmospheric air enters the inside of bellows 34a through the tube 35a to cause the bellows to expand and seat the valve pin 16 on its seat 16a.

In the embodiment of both Figures 4 and 5, water trapped in the valve will drain out through the central tube of the funnel 20 while air entering the nipple 13 will flow upwardly between the walls of the funnel 20 and the nipple casting and will enter the valve through the openings 24 which are above the water in the lower portion of the funnel 20.

In order to describe the drainage of water from the valve, we shall assume that the float 14 has been lifted from its seat by water which has entered the base of the valve and thereby caused the valve pin 16 to move into seating engagement with the valve seat 16a. As soon as sufficient water has accumulated in the valve, drainage will start through tube 27 or through passage 25 of the funnel-shaped member 20. When enough has drained, the float is permitted to drop and venting will continue. In an ordinary valve, the air from the system would have to pass through the nipple 13 against a continuous barrier of water, and this often leads to a water lock which prevents drainage of the valve. In valves of the present invention, however, the air may flow through the annular space separating nipple 13 and the tubes 25 or 27, and thence through the annular space separating the walls of the base member 12 and the conical section of the funnel 20 through apertures 24 and 29 into the space above the water. Even if the water barrier is above the apertures 24, nevertheless the air bubbles entering the water layer at the orifices 24 have less water to pass through than if they must pass through all of the water in the bottom of the valve, and hence vacuum lock in the valve will be relieved sooner and the valve will drain off its water more rapidly than ordinary valves.

The orifices 24 and 29 and the annular spaces are so located and adjusted that once the flow of water is initiated, the flow of water from the vent valve and the counterflow of air into the vent valve are substantially uninterrupted until the drainage of water from the valve is complete. Thus rapid drainage of the valves as distinguished from water-logging is effected. This even flow of air and water permits the draining of the vent valve without so-called spitting, which generally is caused by air bubbles passing at high speed through the water and forming a spray, on breaking through the water surface, which, as the pin 16 recedes from its seat, is carried through the vent port 17 by the escaping air.

The provision of the auxiliary tube 27 is especially advantageous in valves provided with small nipple bores as shown in Figures 1 and 3. When the telescoping drainage tubes extend beyond the extremity of the nipple 13 and the flow of water is once initiated, the water head may be sufficient to cause a continuous flow of water into the system and a counterflow of air into the space above the water level while a drainage tube extending only to the lower edge of the nipple bore might be insufficient for such a purpose. If tube 27 is unseated the water may flow through the tube and also through the annular space separating it from the funnel 20. As shown in Figure 1, the integral tube 25 of the funnel 20 extends approximately to the outer extremity of the nipple port 26. In this arrangement the flow of water cannot impede the counterflow of air by forming a seal across the cross-section of the nipple 13. The illustrated embodiment of Figure 1 constitutes a special feature of the invention.

The conical base members 12 and the funnel member 20 do not have to be accurately fitted and can be used interchangeably in all forms of the valve shown in Figures 1 to 5, so that separate manufacturing operations for these parts of each valve are not necessary.

While preferred embodiments of venting funnels and valves have been illustrated and described, it will be readily understood that the principles of construction herein described can be embodied in other forms of atmospheric and vacuum valves, and that variations in the specific forms herein illustrated can be made without departing from the spirit of our invention or its scope as defined in the claims appended hereto.

We claim:

1. A straight shank vent valve for steam systems comprising a casing having a vent port in its upper portion, a float in the casing provided with a valve extending upwardly for engagement with the vent port, a base with a funnel-shaped interior surface, a nipple extending from the lower portion of the base having an outer end of dimensions suitable to enter standard vent valve tappings of said system, and a funnel positioned within the base in such a manner that its tube extends into the nipple bore, the flared portion of said funnel at its outer periphery resting upon said base and supporting the funnel in said base, said funnel having its flared side wall and tube spaced from the sides of the base and being provided with perforations in the side walls opening into the annular space formed between said walls and said base.

2. A vent valve for steam systems comprising a casing having a vent port, a base with a funnel-shaped inner surface, a straight shank nipple extending from said base, a valve and float unit contained within the casing for opening and closing the port with the rise and descent of the float, a support for said float positioned in the base of the casing and provided with passages for the ingress and egress of air and water to the steam system, a funnel provided with ports near its upper periphery having a flange at its top supporting the funnel on said base and forming a substantially water tight seal with said base, the funnel having its sides spaced from the sides of the base of the valve and its tube extending into the nipple bore.

3. A vent valve for steam systems comprising a casing having a vent port, a base with a funnel-shaped inner surface, a straight shank nipple extending from said base, a valve and float unit contained within the casing for opening and closing the port with the rise and descent of the float, a support for said float positioned in the base of the casing and provided with passages for the ingress and egress of air and water to the steam system, a funnel provided with ports near its upper periphery and having a horizontal flange at its top supporting the funnel on said base, the funnel having its sides spaced from the sides of the base of the valve and its tube extending through the nipple bore, said tube being smaller than the nipple bore and slidable through the orifice at the apex of the conical section of the funnel to extend beyond the nipple.

4. A vent valve for steam systems comprising a casing having a vent port, a straight shank base having a downwardly contracting chamber with a nipple extending from the lower portion of the base capable of threadably entering standard vent valve tappings of said systems, a valve and float unit positioned within the casing for opening and closing the vent port with rise and descent of the float, and a support for said float attached to the base of the casing, provided with ports for the passage of air and water to and from the vent valve and the steam system, a funnel-shaped member having openings near its upper periphery and having a horizontal flange positioned in sealed relationship with said base with its sides annularly displaced from the walls of the base and a tube extending through the nipple bore and annularly displaced from the inner wall of the nipple, said tube being slidable through the orifice at the apex of the conical section of the funnel and being provided with flanged sides for seating on said conical section of the funnel.

5. In a vent valve for steam heating systems having a vent port, a float supported valve element for opening and closing said port, a support for said float, and a base having a downwardly contracting chamber and a straight shank nipple for mounting the valve in steam heating systems, means for draining the valve at a regulated rate when water has risen in the valve to a level higher than that necessary for closing the vent port, said means comprising, in combination, a funnel-shaped member provided with perforations in its side walls and a tube smaller than the nipple bore positioned within the base of the vent valve with its sides spaced from the wall of the base and its tube extending into the nipple bore of the shank, a flange on said funnel resting on said base and a support for said float in sealed relation with the base and said flange on the funnel-shaped member provided with ports for ingress and egress of air and water to the steam systems, said ports, perforations and annular spacings being so correlated as to regulate the flow of water at the desired rate.

6. A vent valve for steam radiators comprising a casing having a vent port and a base member having a funnel-shaped inner surface and provided with a straight shank nipple for connection with such radiators, a float valve in the casing for opening and closing said port and means organized to cause drainage of water at a controlled rate from the casing after the valve has closed and the flow of water from the vent valve has been initiated, said means comprising a funnel with ports in its sides and a flange on its outer periphery supported on the base so that the funnel tube extends into the bore of the nipple, said funnel being spaced from the walls of the base such that said ports communicate with the outer extremity of the nipple bore through a continuous passage formed between the walls of the funnel and the base.

7. A vent valve for steam systems comprising a casing having a vent port and a base member with a downwardly contracting chamber and provided with an integral straight shank nipple for engagement with standard vent valve tappings of steam systems, a combined float and thermal valve in the casing for opening and closing said port, and means for draining the vent valve at a regulated rate when water has risen to a height causing said float valve to close the vent port, said means comprising, in combination, a support for said float supported by said base and provided with passages connecting the float chamber with the base and a funnel shaped member with ports in its sides attached to said base and directly supported therefrom with its tube extending into the nipple bore, said funnel having its sides and tube annularly displaced from the walls of said chamber, said funnel shaped member being provided with an auxiliary tube of greater length than the nipple bore and a smaller diameter than the aforementioned tube and being slidable in said tube.

8. A straight shank vent valve for steam systems comprising a casing with a vent port in its upper portion, a base for said casing having a funnel-shaped interior surface, a nipple extending from the lower portion of the base for connection with said steam systems, a float positioned within said casing provided with cooperating means for opening and closing the vent port with the rise and fall of water within the casing, a support for said float, a funnel having ports in its side walls positioned on said base with its tube extending into the nipple bore, said funnel being so positioned that said ports are in communication with a continuous air passageway existing between the walls of the funnel and said base and said float support resting on the outer edge of said funnel.

9. A vent valve for steam systems comprising a casing having a vent port in its upper portion, a base for said casing having solid walls and a funnel-shaped interior provided with an integral nipple having an outer end of dimensions suitable for entering standard vent valve tappings of steam systems, a valve and float unit contained within the casing for closing and opening the vent port with the rise and fall of the float, a support for the float having passages for the ingress and egress of fluids from the float chamber to the base positioned in the lower portion of the casing, a funnel resting on said base and supporting said float support, said funnel having perforations in its side walls and positioned in said base with its tube extending through the nipple bore, the walls of said funnel being spaced from the walls of said base.

10. A vent valve for steam systems comprising a casing with a vent port in its upper portion, a solid base member having a funnel-shaped interior and an annular internal shoulder, an integral nipple extending from the lower portion of the base capable of threadably entering the standard valve tappings of steam systems, a combined thermal and float valve positioned within the casing for opening and closing the vent port, a support for said thermal and float valve provided with fluid passages connecting the float chamber with the base, a funnel having apertures in its side walls positioned in the base with its tube extending through the bore of the nipple and a flanged lip supported on such annular shoulder, said float value support resting on said funnel flange and said funnel having its side walls and its tube annularly displaced from the walls of said base.

11. A vent valve for steam heating systems comprising a casing with a vent port in its upper portion, a base member with a funnel shaped interior surface and an integral nipple for connection with standard tapping of steam systems, a float positioned in the casing provided with cooperating means for opening and closing said vent port, a support for said float provided with passages connecting the float chamber with the base and supported by said base, a diaphragm hermetically sealed to said support and opened to the atmosphere, a funnel having apertures in its side walls positioned in the base and resting on said base with its tube extending through the bore of the nipple, said funnel being so positioned that said apertures communicate with the outer extremity of the nipple bore through a continuous passage formed between the base and the funnel.

JAMES A. PARTON.
JOHN B. PACE.